United States Patent
Tezuka

(10) Patent No.: US 10,419,443 B2
(45) Date of Patent: Sep. 17, 2019

(54) AUTHENTICATION SERVER, AUTHENTICATION METHOD IN AUTHENTICATION SERVER, AND NON-TRANSITORY COMPUTER READABLE MEDIUM STORING AUTHENTICATION PROCESS PROGRAM OF AUTHENTICATION SERVER

(71) Applicant: NEC Corporation, Minato-ku, Tokyo (JP)

(72) Inventor: Yukiko Tezuka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 78 days.

(21) Appl. No.: 15/536,759

(22) PCT Filed: Nov. 12, 2015

(86) PCT No.: PCT/JP2015/005642
§ 371 (c)(1),
(2) Date: Jun. 16, 2017

(87) PCT Pub. No.: WO2016/120921
PCT Pub. Date: Aug. 4, 2016

(65) Prior Publication Data
US 2017/0346832 A1    Nov. 30, 2017

(30) Foreign Application Priority Data

Jan. 26, 2015 (JP) ................................. 2015-012453

(51) Int. Cl.
*G06F 21/00* (2013.01)
*H04L 29/06* (2006.01)
(Continued)

(52) U.S. Cl.
CPC ............ *H04L 63/107* (2013.01); *G06F 21/34* (2013.01); *G06F 21/35* (2013.01); *G06F 21/62* (2013.01);
(Continued)

(58) Field of Classification Search
None
See application file for complete search history.

(56) References Cited

U.S. PATENT DOCUMENTS 9,075,979 B1 * 7/2015 Queru .................... G06F 21/34
2012/0317229 A1    12/2012 Shimakawa
(Continued)

FOREIGN PATENT DOCUMENTS

JP    2006-350588 A    12/2006
JP    2013-003661 A    1/2013
(Continued)

OTHER PUBLICATIONS

International Search Report for PCT Application No. PCT/JP2015/005642, dated Dec. 28, 2015.

*Primary Examiner* — Alexander Lagor

(57) ABSTRACT

According to one embodiment, an authentication method in an authentication server determines, based on positional information of a terminal to be used and positional information of a user terminal, whether the distance between the terminal to be used and the user terminal is within a predetermined distance and determines, based on the result of the determination, whether to allow a user of user identification information transmitted from the user terminal to use a predetermined service using the terminal to be used. It is therefore possible to associate the user, the service, and the terminal to be used with one another in a state in which a high security performance is maintained.

7 Claims, 9 Drawing Sheets

(51) Int. Cl.
　　　*G06F 21/62*　　　(2013.01)
　　　*G06F 21/35*　　　(2013.01)
　　　*H04W 12/06*　　　(2009.01)
　　　*G06F 21/34*　　　(2013.01)
　　　*H04W 4/02*　　　(2018.01)
　　　*H04W 12/08*　　　(2009.01)

(52) U.S. Cl.
　　　CPC ............. *H04L 63/08* (2013.01); *H04W 4/023* (2013.01); *H04W 12/06* (2013.01); *H04W 12/08* (2013.01); *G06F 2221/2111* (2013.01)

(56) References Cited

U.S. PATENT DOCUMENTS

| | | |
|---|---|---|
| 2014/0359737 A1 | 12/2014 | Ishizu |
| 2016/0019540 A1* | 1/2016 | Tsutsui ................ G06Q 20/327 705/71 |

FOREIGN PATENT DOCUMENTS

| | | |
|---|---|---|
| JP | 2013-143064 A | 7/2013 |
| JP | 2014-232390 A | 12/2014 |

\* cited by examiner

AUTHENTICATION SERVER, AUTHENTICATION METHOD IN AUTHENTICATION SERVER, AND NON-TRANSITORY COMPUTER READABLE MEDIUM STORING AUTHENTICATION PROCESS PROGRAM OF AUTHENTICATION SERVER

This application is a National Stage Entry of PCT/JP2015/005642 filed on Nov. 12, 2015, which claims priority from Japanese Patent Application 2015-012453 filed on Jan. 26, 2015, the contents of all of which are incorporated herein by reference, in their entirety.

TECHNICAL FIELD

The present invention relates to an authentication server, an authentication method in the authentication server, and a non-transitory computer readable medium storing an authentication process program of the authentication server.

BACKGROUND ART

While "user authentication", which is authentication of a person who uses IT services, has been mainly performed at the time of authentication when the IT services are used, authentication of an object such as a terminal or a device has been performed as well as the user authentication due to the recent prevailing of Internet of Things (IoT) and the like. The authentication of the object is performed, for example, by transmitting identification information (serial number) of the terminal or the device to an authentication server.

A related technique is disclosed in Patent Literature 1. An authentication method disclosed in Patent Literature 1 determines, based on user identification information and identification information of a user-side device such as a smartphone transmitted from the user-side device and identification information of a setting-target device transmitted from the setting-target device, which is a device the user wants to associate with the user-side device, whether to associate the user-side device with the setting-target device.

CITATION LIST

Patent Literature

[Patent Literature 1] Japanese Unexamined Patent Application Publication No. 2013-3661

SUMMARY OF INVENTION

Technical Problem

In the authentication method disclosed in Patent Literature 1, security performance when the user-side device (user terminal) and the setting-target device (terminal to be used) are associated with each other is not sufficiently high. As a result, there is a problem, for example, that the terminal to be used is used by a third party who has no right to use it.

The present invention has been made in order to solve the aforementioned problem and aims to provide an authentication server capable of allowing the user to use the service using the terminal to be used only when the distance between the terminal to be used and the mobile terminal is short, to thereby able to associate the user, the service, and the terminal to be used with one another in a state in which a high security performance is maintained, an authentication method in the authentication server, and a non-transitory computer readable medium storing an authentication process program of the authentication server.

Solution to Problem

According to one embodiment, an authentication method in an authentication server includes: a first determination step for determining, based on positional information of a terminal to be used and positional information of a mobile terminal which is different from the terminal to be used, whether the distance between the terminal to be used and the mobile terminal is within a predetermined distance; and a determination step for determining, based on the result of the determination in the first determination step, whether to allow a user of user identification information transmitted from the mobile terminal to use a predetermined service using the terminal to be used.

According to one embodiment, an authentication server includes: a distance determination unit for determining, based on positional information of a terminal to be used and positional information of a mobile terminal which is different from the terminal to be used, whether the distance between the terminal to be used and the mobile terminal is within a predetermined distance; and an availability determination unit for determining, based on the result of the determination in the distance determination unit, whether to allow a user of user identification information transmitted from the mobile terminal to use a predetermined service using the terminal to be used.

According to one embodiment, an authentication process program of an authentication server causes a computer to execute the following processes: a first determination process for determining, based on positional information of a terminal to be used and positional information of a mobile terminal which is different from the terminal to be used, whether the distance between the terminal to be used and the mobile terminal is within a predetermined distance; and a determination process for determining, based on the result of the determination in the first determination process, whether to allow a user of user identification information transmitted from the mobile terminal to use a predetermined service using the terminal to be used.

Advantageous Effects of Invention

According to the embodiment, it is possible to provide an authentication server capable of allowing the user to use the service using the terminal to be used only when the distance between the terminal to be used and the mobile terminal is short, to thereby able to associate the user, the service, and the terminal to be used with one another in a state in which a high security performance is maintained, an authentication method in the authentication server, and a non-transitory computer readable medium storing an authentication process program of the authentication server.

DESCRIPTION OF EMBODIMENTS

Figure 1:
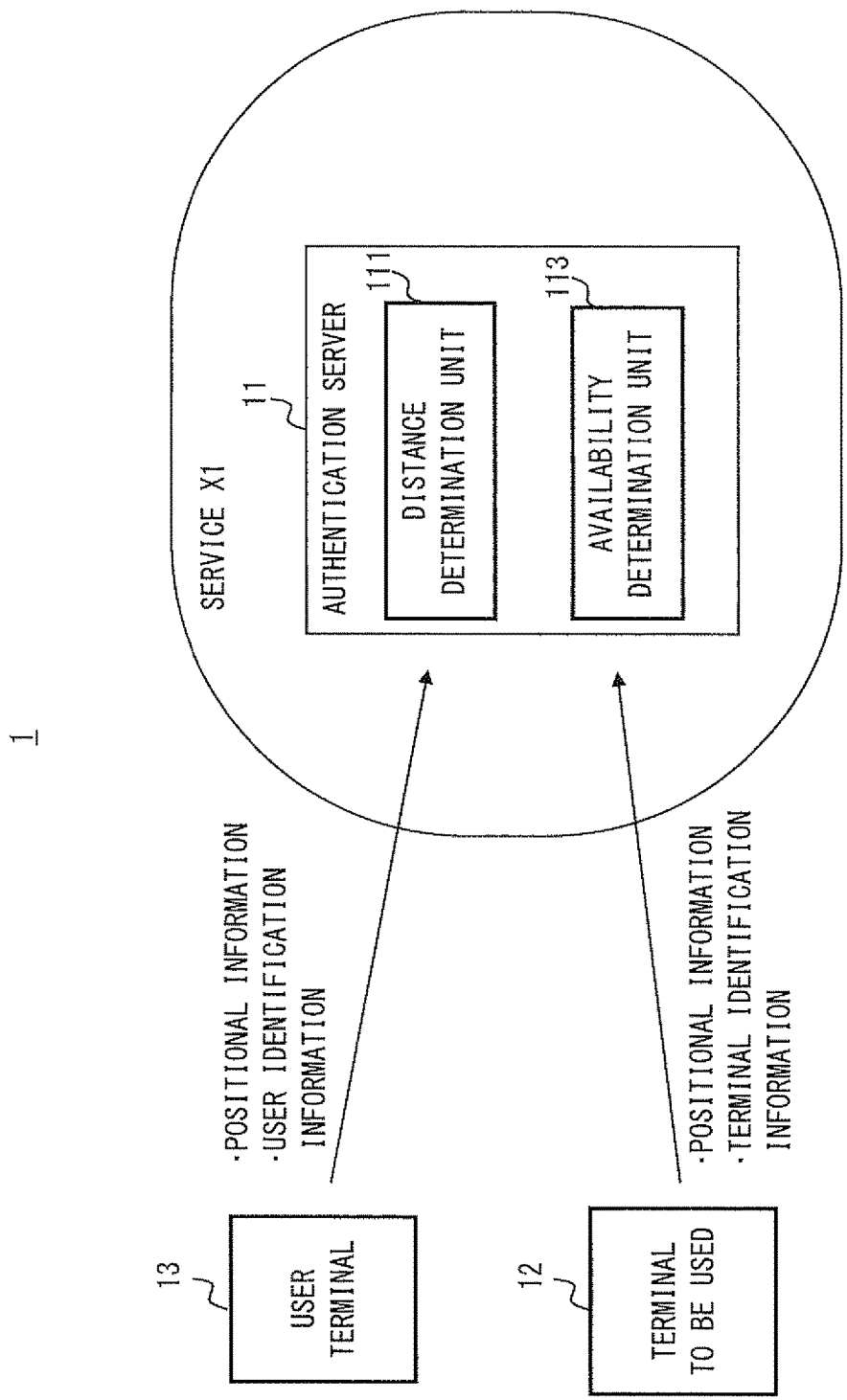
FIG. 1 is a block diagram showing a configuration example of a communication system according to a first embodiment.

Hereinafter, with reference to the drawings, embodiments will be described. Since the drawings are in a simplified form, the technical scope of the embodiments must not be narrowly interpreted based on the drawings. Further, the same elements are denoted by the same reference numerals, and a duplicate description is omitted as necessary.

In the following embodiments, when necessary, a description will be given by using separate sections or separate embodiments. However, those embodiments are not unrelated with each other, unless otherwise specified. That is, they are related in such a manner that one embodiment is a modified example, an application example, a detailed example, or a supplementary example of a part or the whole of another embodiment. Further, in the following embodiments, when the number of elements or the like (including numbers, values, quantities, ranges, and the like) is mentioned, the number is not limited to that specific number except for cases where the number is explicitly specified or the number is obviously limited to a specific number based on its principle. That is, a larger number or a smaller number than the specific number may also be used.

Further, in the following embodiments, the components (including operation steps and the like) are not necessarily indispensable except for cases where the component is explicitly specified or the component is obviously indispensable based on its principle. Similarly, in the following embodiments, when a shape, a position relation, or the like of a component(s) or the like is mentioned, shapes or the like that are substantially similar to or resemble that shape are also included in that shape except for cases where it is explicitly specified or they are eliminated based on its principle. This is also true for the above-described number or the like (including numbers, values, quantities, ranges, and the like).

<First Embodiment>

FIG. 1 is a block diagram showing a configuration example of a communication system 1 according to a first embodiment.

As shown in FIG. 1, the communication system 1 includes an authentication server 11, a terminal to be used 12, and a user terminal (mobile terminal) 13.

The terminal to be used 12 is, for example, a sensor terminal of a health care system, a public shared terminal, a notebook PC of a company or the like and is one of dedicated terminals capable of using a Web service X1 (hereinafter it will be simply referred to as a service X1) provided by the communication system 1. The user terminal 13 is, for example, a mobile terminal such as a smartphone held by a user.

The authentication server 11 can communicate with the terminal to be used 12 and the user terminal 13 and has a function of determining whether to allow the user to use the service X1 using the terminal to be used 12. In other words, the authentication server 11 has a function of determining whether to associate (link) the user, the service X1, and the terminal to be used 12 with one another.

The authentication server 11 includes at least a distance determination unit 111 and an availability determination unit 113. The details of each of these components will be given later together with a description of the flowchart shown in FIG. 2.

(Authentication Method in Authentication Server 11)

Next, with reference to FIG. 2 in addition to FIG. 1, an authentication method in the authentication server 11 will be described.

Figure 2:
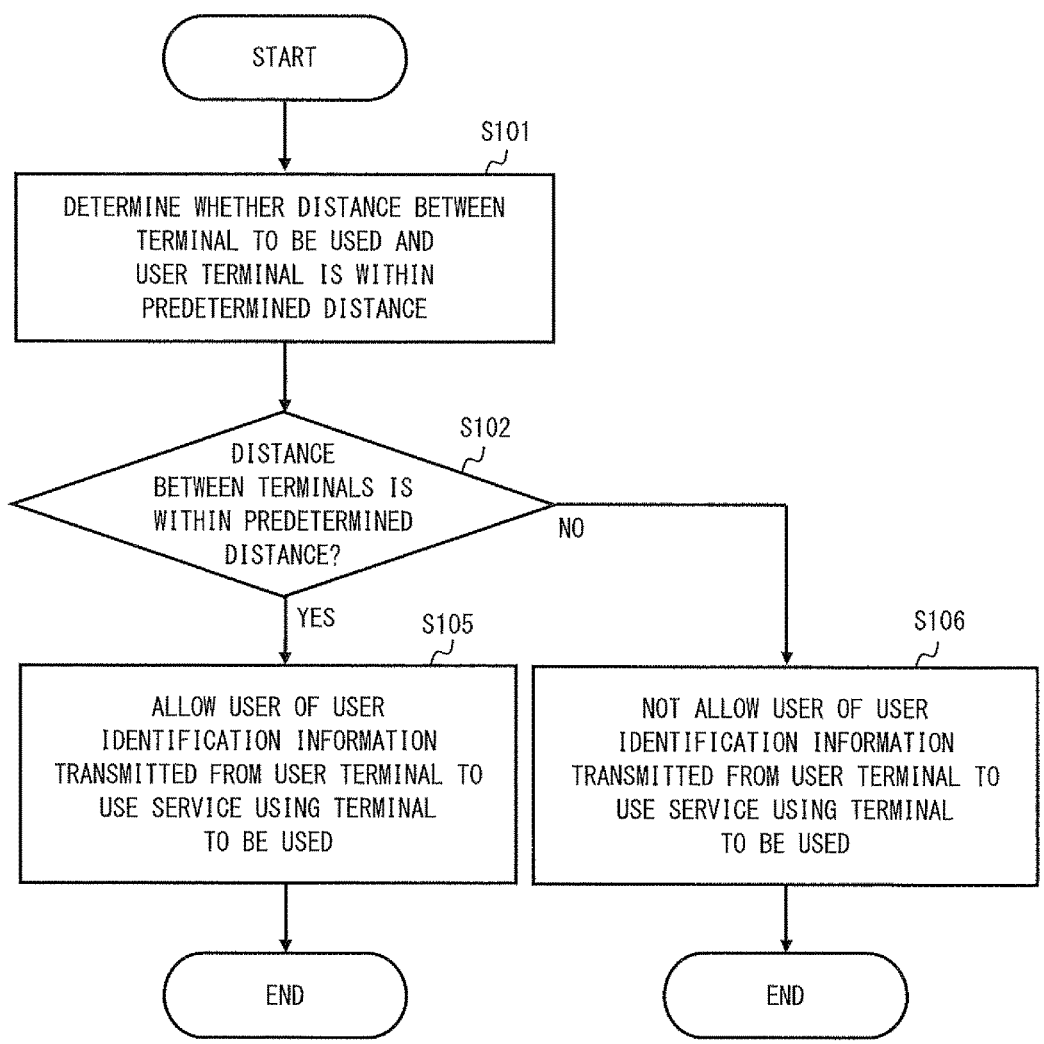
FIG. 2 is a flowchart showing an authentication method in an authentication server shown in FIG. 1.

FIG. 2 is a flowchart showing the authentication method in the authentication server 11.

When the user wants to use the service X1 using the terminal to be used 12, the user accesses the service X1 from the user terminal 13 to transmit positional information and user identification information (ID) and accesses the service X1 from the terminal to be used 12 to transmit positional information and terminal identification information. It is assumed that the user identification information (ID) is registered in the authentication server 11 in advance.

The user logs into the service X1 from the user terminal 13 by, for example, inputting the ID and the password. After the user logs into the service X1, the user presses (clicks) the "device registration" button for registering the terminal to be used 12 displayed on the screen of the user terminal 13. Accordingly, the positional information and the user identification information of the user terminal 13 are transmitted to the authentication server 11. While the time when the "device registration" button has been pressed is defined to be an access time from the user terminal 13 to the service X1 (authentication server 11) in this example, this is merely an example and a desired trigger may be defined to be the access time.

Further, the user presses, for example, a predetermined button displayed on the screen of the terminal to be used 12, a predetermined button physically provided in the terminal to be used 12 or the like. Accordingly, the positional information and the terminal identification information of the terminal to be used 12 are transmitted to the authentication server 11. While the time when the predetermined button of the terminal to be used 12 has been pressed is defined to be an access time from the terminal to be used 12 to the service X1 (authentication server 11) in this example, this is merely an example and a desired trigger may be defined to be the access time.

The positional information of the user terminal 13 and that of the terminal to be used 12 may be transmitted to the authentication server 11 regularly and automatically instead of being transmitted to the authentication server 11 when the button is pressed by the user. The transmission of the positional information is performed using, for example, Global Positioning System (GPS) or the like.

In this case, in the authentication server 11, first, the distance determination unit 111 calculates, based on the positional information of the terminal to be used 12 and that of the user terminal 13, the distance between the terminal to be used 12 and the user terminal 13, and determines whether this distance is within a predetermined distance (Step S101). While the predetermined distance can be arbitrarily defined, it is typically within a range between 5 and 10 m when, for example, it is assumed that a smartphone is used as the user terminal 13.

When, for example, the distance between the terminal to be used 12 and the user terminal 13 is outside the predetermined distance (NO in Step S102), the availability determination unit 113 of the authentication server 11 does not allow the user of the user identification information transmitted from the user terminal 13 to use the service X1 using the terminal to be used 12 (Step S106).

On the other hand, when the distance between the terminal to be used 12 and the user terminal 13 is within the predetermined distance (YES in Step S102), the availability determination unit 113 of the authentication server 11 allows the user of the user identification information transmitted from the user terminal 13 to use the service X1 using the terminal to be used 12 (Step S105). That is, the authentication server 11 associates (links) the user, the service X1, and the terminal to be used 12 with one another.

In this way, the authentication server 11 according to this embodiment allows the user to use the service X1 using the terminal to be used 12 only when the distance between the terminal to be used 12 and the user terminal 13 is short. Accordingly, the authentication server 11 is able to associate (link) the user, the service X1, and the terminal to be used 12 with one another in a state in which a high security performance is maintained. As a result, the communication system 1 is able to prevent a situation in which, for example, a third party who has no right to use the terminal to be used uses it.

Figure 3:
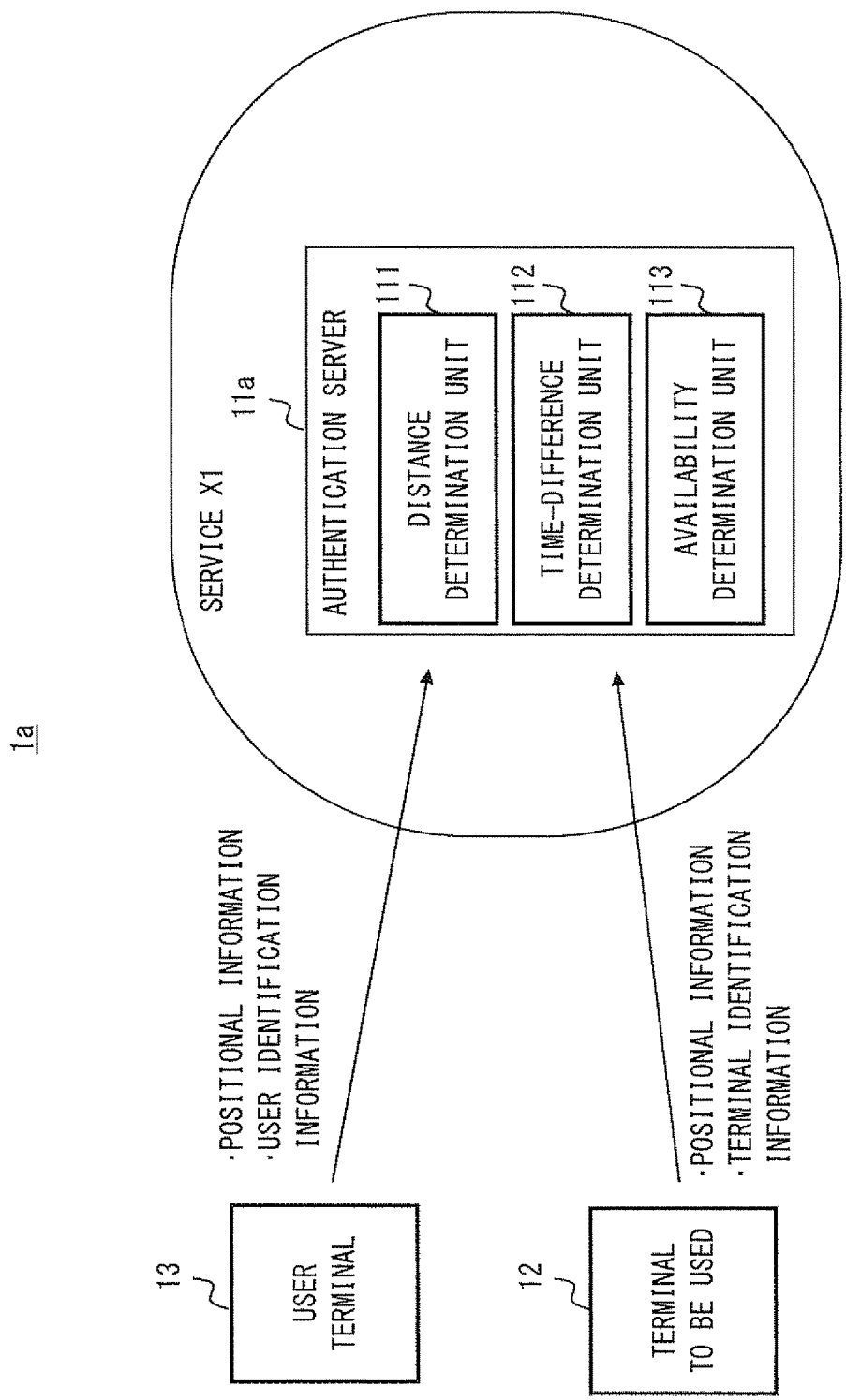
FIG. 3 is a block diagram showing a modified example of the communication system shown in FIG. 1.

(Modified Example of Communication System 1) FIG. 3 is a diagram showing a modified example of the communication system 1 as a communication system 1a. The communication system 1a includes, in place of the authentication server 11, an authentication server 11a in which a time-difference determination unit 112 is further provided.

Figure 4:
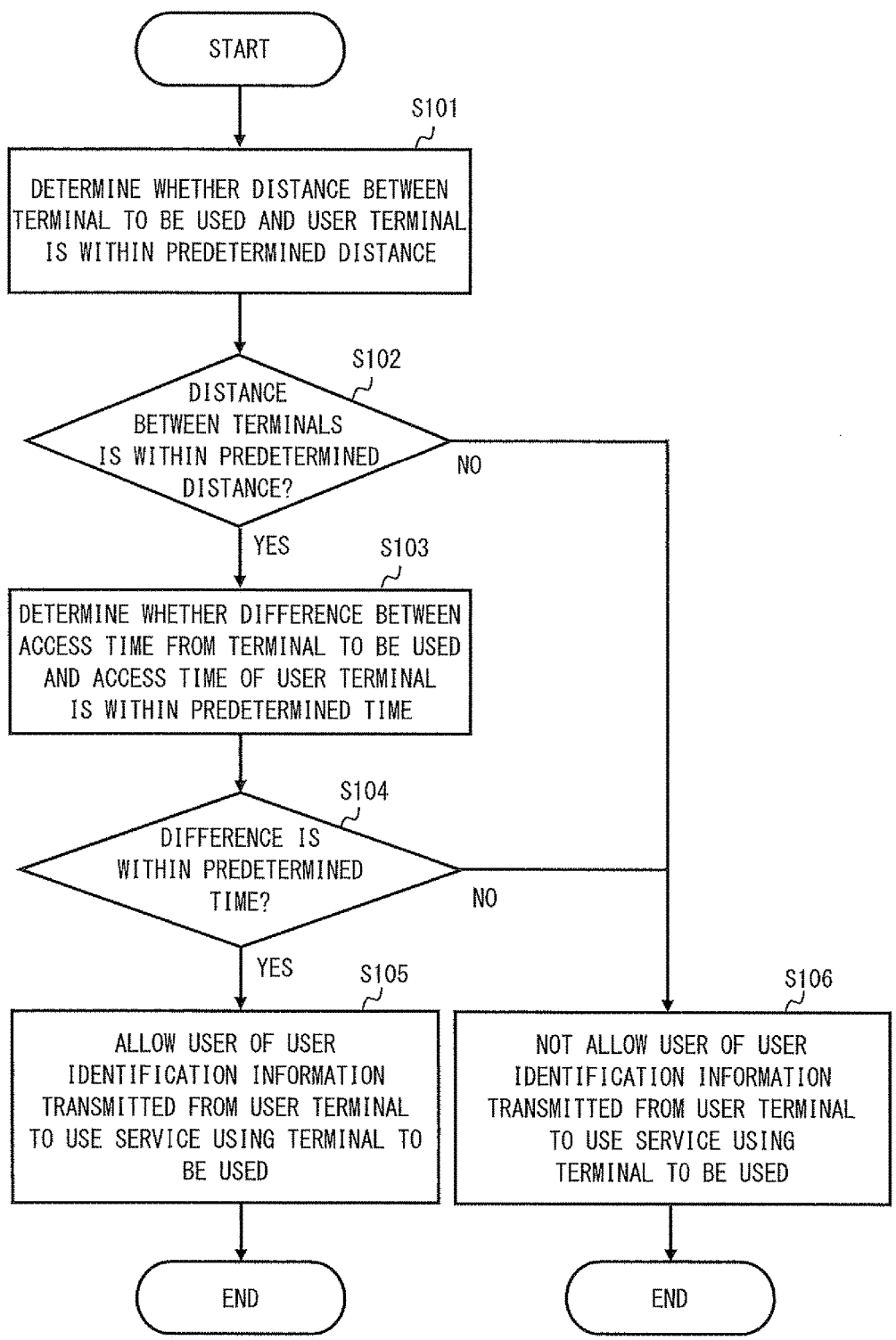
FIG. 4 is a flowchart showing an authentication method in the authentication server shown in FIG. 3.

FIG. 4 is a flowchart showing an authentication method in the authentication server 11a. In the flowchart shown in FIG. 4, compared to the flowchart shown in FIG. 2, processes of Steps S103 and S104 are added to the flowchart shown in FIG. 2.

When the distance between the terminal to be used 12 and the user terminal 13 is within the predetermined distance (YES in Step S102), the time-difference determination unit 112 in the authentication server 11a next determines whether the difference between the access time from the terminal to be used 12 and the access time from the user terminal 13 is within a predetermined time (Step S103). While the predetermined time can be arbitrarily defined, the smaller the value is, the higher the security performance of the association becomes.

When, for example, the difference between both of the access times is outside the predetermined time (NO in Step S104), the availability determination unit 113 of the authentication server 11a does not allow the user of the user identification information transmitted from the user terminal 13 to use the service X1 using the terminal to be used 12 (Step S106).

On the other hand, when the difference between both of the access times is within the predetermined time (YES in Step S104), the availability determination unit 113 of the authentication server 11a allows the user of the user identification information transmitted from the user terminal 13 to use the service X1 using the terminal to be used 12 (Step S105). That is, the authentication server 11a associates (links) the user, the service X1, and the terminal to be used 12 with one another.

In this way, the authentication server 11a according to this embodiment allows the user to use the service X1 using the terminal to be used 12 only when the distance between the terminal to be used 12 and the user terminal 13 is small and the difference between the access time from the terminal to be used 12 and the access time from the user terminal 13 is small. Accordingly, the authentication server 11a is able to associate (link) the user, the service X1, and the terminal to be used 12 with one another in a state in which a high security performance is maintained. As a result, the communication system 1 is able to prevent a situation in which, for example, a third party who has no right uses the terminal to be used.

(Hardware Configuration of Authentication Server 11)

The authentication servers 11 and 11a can be achieved by, for example, a versatile computer system. In the following description, with reference to FIG. 5, a brief description will be given.

Figure 5:
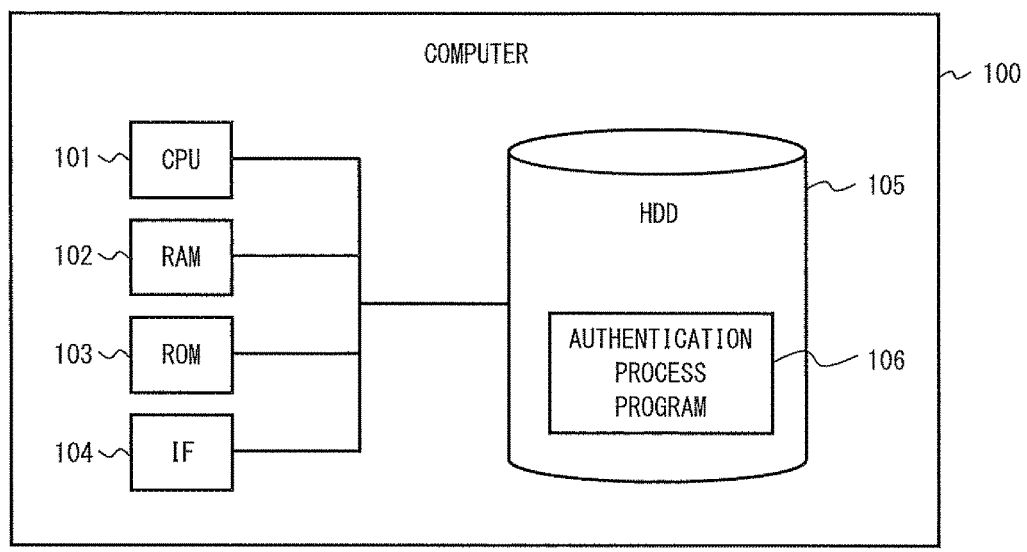
FIG. 5 is a block diagram showing one example of a hardware configuration of the authentication server shown in FIGS. 1 and 3.

FIG. 5 is a block diagram showing one example of a hardware configuration of the authentication servers 11 and 11a. A computer 100 includes, for example, a Central Processing Unit (CPU) 101, which is a control apparatus, a Random Access Memory (RAM) 102, a Read Only Memory (ROM) 103, an Inter Face (IF) 104, which is an interface with an external device, and a Hard Disk Drive (HDD) 105, which is one example of a non-volatile storage device.

The HDD 105 stores an Operating System (OS) (not shown) and an authentication process program 106. The authentication process program 106 is a computer program in which the authentication process according to this embodiment is implemented.

The CPU 101 controls various processing in the computer 100, access to the RAM 102, the ROM 103, the IF 104, and the HDD 105 etc. In the computer 100, the CPU 101 loads and executes the OS and the authentication process program 106 stored in the HDD 105. The computer 100 thereby achieves the authentication servers 11 and 11a according to this embodiment.

<Second Embodiment>

Figure 6:
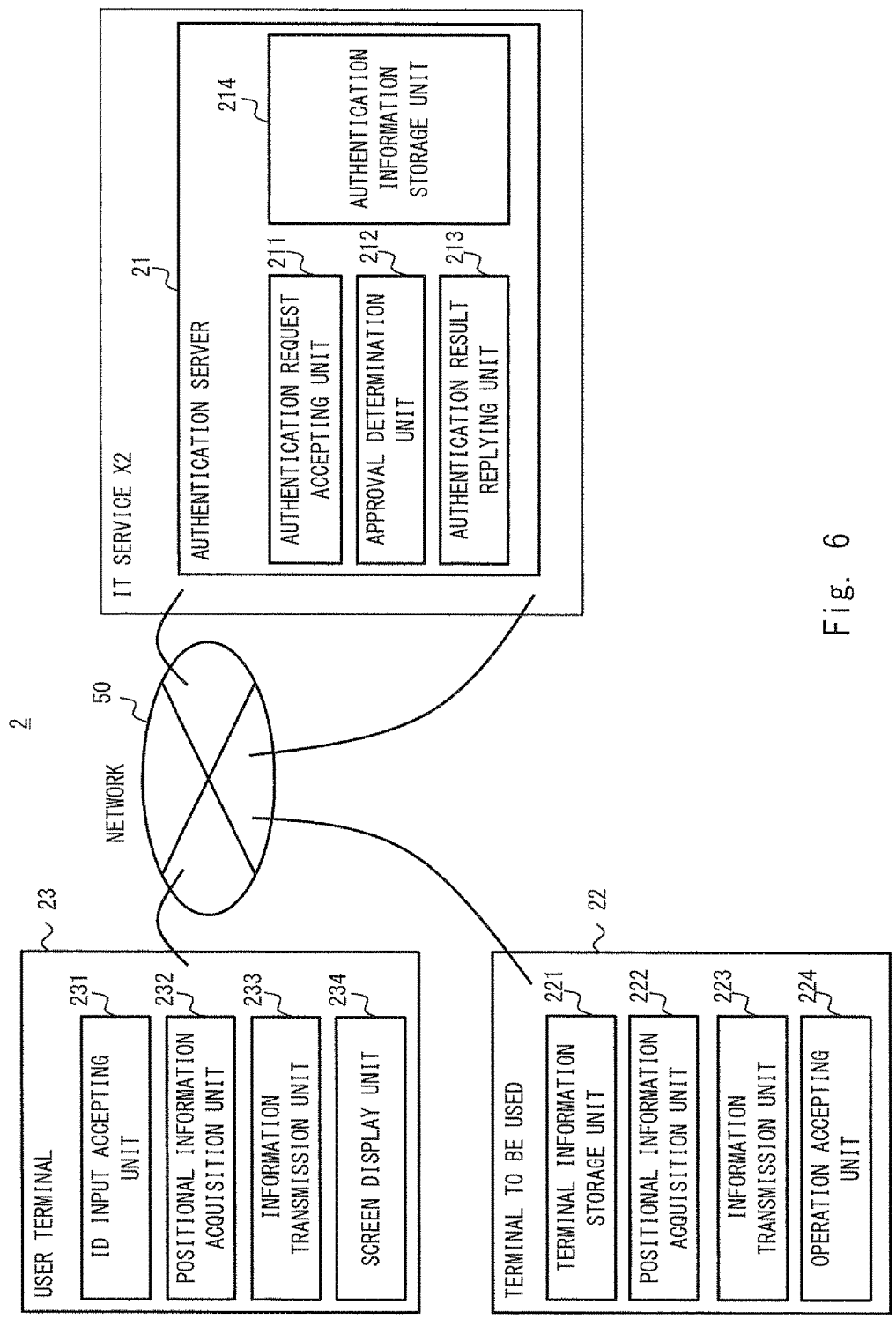
FIG. 6 is a block diagram showing a configuration example of a communication system according to a second embodiment.

FIG. 6 is a block diagram showing a configuration example of a communication system 2 according to a second embodiment. The communication system 2 shows one example of a more specific configuration of the communication system 1a shown in FIG. 3.

As shown in FIG. 6, the communication system 2 includes an authentication server 21, a terminal to be used 22, and a user terminal 23. The authentication server 21, the terminal to be used 22, and the user terminal 23 respectively correspond to the authentication server 11a, the terminal to be used 12, and the user terminal 13 in the communication system 1a. Further, an IT service X2 is, for example, a health care system for consumers, and corresponds to the service X1 in the communication system 1a.

The authentication server 21 includes an authentication request accepting unit 211, an approval determination unit 212, an authentication result replying unit 213, and an authentication information storage unit 214. Note that the approval determination unit 212 has the functions of the distance determination unit 111, the time-difference determination unit 112, and the availability determination unit 113 of the authentication server 11a in the communication system 1a. The details of each of these components will be given later together with a description of the flowchart shown in FIG. 7.

The terminal to be used 22 is, for example, a sensor terminal of a health care system, and includes a terminal information storage unit 221, a positional information acquisition unit 222, an information transmission unit 223, and an operation accepting unit 224. The user terminal 23 includes an ID input accepting unit 231, a positional information acquisition unit 232, an information transmission unit 233, and a screen display unit 234. The details of each of these components will be given later together with a description of the flowchart shown in FIG. 7.

The authentication server 21, the terminal to be used 22, and the user terminal 23 can communicate with one another via a network 50.

(Operations of Communication System 2)

Next, with reference to FIG. 7 as well as FIG. 6, operations of the communication system 2 will be described.

Figure 7:
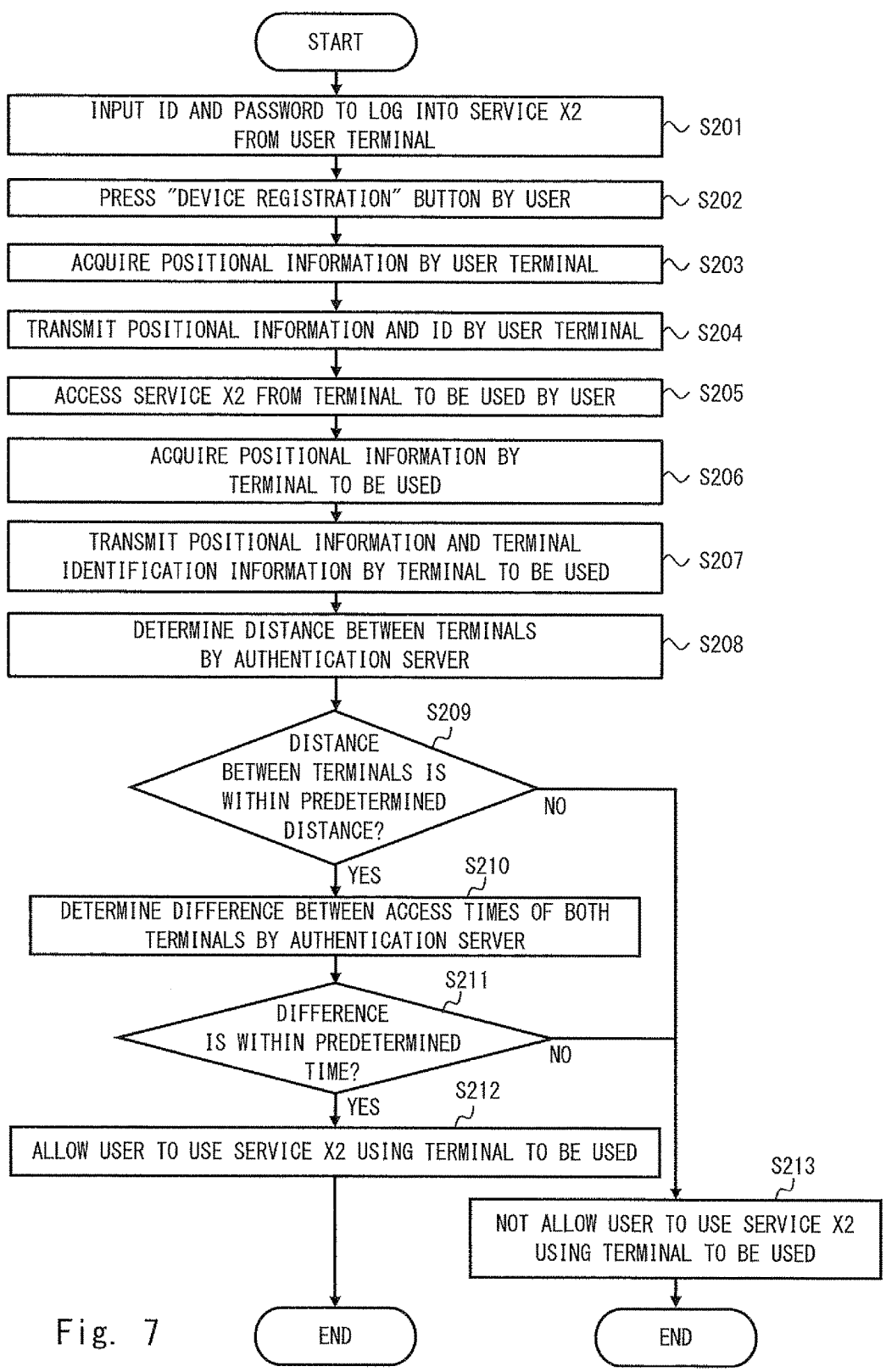
FIG. 7 is a flowchart showing operations of the communication system shown in FIG. 6.

FIG. 7 is a flowchart showing the operations of the communication system 2.

When the user wants to use the IT service X2 using the terminal to be used 22, which is a sensor terminal, the user accesses the IT service X2 from the user terminal 23 to transmit the positional information and the user identification information (ID) and accesses the IT service X2 from the terminal to be used 22 to transmit the positional information and the terminal identification information. It is assumed that the user identification information (ID) of the user terminal 23 is registered in the authentication server 21 in advance.

Specifically, the user inputs the ID and the password into the login screen of the IT service X2 displayed on the screen display unit 234 of the user terminal 23 (that is, the user inputs the ID into the ID input accepting unit 231 of the user terminal 23) to log into the IT service X2 from the user terminal 23 (Step S201).

After the user logs into the IT service X2, the user presses (clicks) the "device registration" button displayed on the screen display unit 234 of the user terminal 23 (Step S202). In response to this operation, the positional information acquisition unit 232 of the user terminal 23 acquires the positional information of the user terminal 23 (Step S203).

After that, the information transmission unit 233 of the user terminal 23 transmits the positional information acquired by the positional information acquisition unit 232 and the user identification information input to the ID input accepting unit 231 to the authentication server 21 (Step S204).

While the time when the "device registration" button has been pressed is defined to be an access time from the user terminal 23 to the IT service X2 (authentication server 21) in this example, this is merely an example and a desired trigger may be defined to be the access time.

Furthermore, the user presses a predetermined button displayed on the screen of the terminal to be used 22, a predetermined button physically provided in the terminal to be used 22 or the like. That is, the user accesses the IT service X2 from the terminal to be used 22 (Step S205). This operation is accepted by the operation accepting unit 224 of the terminal to be used 22. In response to this operation, the positional information acquisition unit 222 of the terminal to be used 22 acquires the positional information of the terminal to be used 22 (Step S206). Then the information transmission unit 223 of the terminal to be used 22 transmits the positional information acquired by the positional information acquisition unit 222 and the terminal identification information stored in the terminal information storage unit 221 to the authentication server 21 (Step S207).

While the time when the predetermined button of the terminal to be used 22 has been pressed is defined to be an access time from the terminal to be used 22 to the IT service X2 (authentication server 21) in this example, this is merely an example and a desired trigger may be defined to be the access time.

Note that the positional information of the user terminal 23 and the terminal to be used 22 may be transmitted to the authentication server 21 regularly and automatically instead of being transmitted to the authentication server 21 when the button is pressed by the user.

The information transmitted from the terminal to be used 22 and the information transmitted from the user terminal 23 are received by the authentication request accepting unit 211 of the authentication server 21.

The approval determination unit 212 of the authentication server 21 first calculates, based on the positional information of the terminal to be used 22 and that of the user terminal 23, the distance between the terminal to be used 22 and the user terminal 23 and determines whether this distance is within a predetermined distance (Step S208). While the predetermined distance can be arbitrarily defined, it is typically in a range between 5 and 10 m when, for example, it is assumed that a smartphone is used as the user terminal 13.

When, for example, the distance between the terminal to be used 22 and the user terminal 23 is outside the predetermined distance (NO in Step S209), the approval determination unit 212 does not allow the user of the user identification information transmitted from the user terminal 23 to use the IT service X2 using the terminal to be used 22 (Step S213). This information is sent back to, for example, the user terminal 23 by the authentication result replying unit 213.

On the other hand, when the distance between the terminal to be used 22 and the user terminal 23 is within a predetermined distance (YES in Step S209), the approval determination unit 212 of the authentication server 21 next determines whether the difference between the access time from the terminal to be used 22 and the access time from the user terminal 23 is within the predetermined time (Step S210). While the predetermined time can be arbitrarily defined, the smaller the value is, the higher the security performance of the association becomes.

When, for example, the difference between both of the access times is outside the predetermined time (NO in Step S211), the approval determination unit 212 does not allow the user of the user identification information transmitted from the user terminal 23 to use the IT service X2 using the terminal to be used 22 (Step S213). This information is sent back to, for example, the user terminal 23 by the authentication result replying unit 213.

On the other hand, when the difference between both of the access times is within the predetermined time (YES in Step S211), the approval determination unit 212 allows the user of the user identification information transmitted from the user terminal 23 to use the IT service X2 using the terminal to be used 22 (Step S211). That is, the authentication server 21 associates (links) the user, the IT service X2, and the terminal to be used 22 with one another. This information is stored in the authentication information storage unit 214 of the authentication server 21. At the same time, this information is sent back to, for example, the user terminal 23 by the authentication result replying unit 213.

As described above, the authentication server 21 according to this embodiment allows the user to use the IT service X2 using the terminal to be used 22 only when the distance between the terminal to be used 22 and the user terminal 23 is short and the difference between the access time from the terminal to be used 22 and the access time from the user terminal 23 is small. Accordingly, the authentication server 21 is able to associate (link) the user, the IT service X2, and the terminal to be used 22 with one another in a state in which a high security performance is maintained. As a result, the communication system 2 is able to prevent a situation in which, for example, a third party who has no right uses the terminal to be used.

In this embodiment, even when the terminal to be used 22 does not include a display screen, it is possible to associate the user, the IT service X2, and the terminal to be used 22 with one another using the user terminal 23. Further, information (e.g., heart rate) that has been transmitted to the IT service X2 from the terminal to be used 22, which is the sensor terminal, can be, for example, viewed from the user terminal 23. That is, it is possible to improve the usability. In order to further enhance the reliability, the user may be required to input the terminal identification information of the terminal to be used 22 into the screen of the user terminal 23.

<Third Embodiment>

Figure 8:
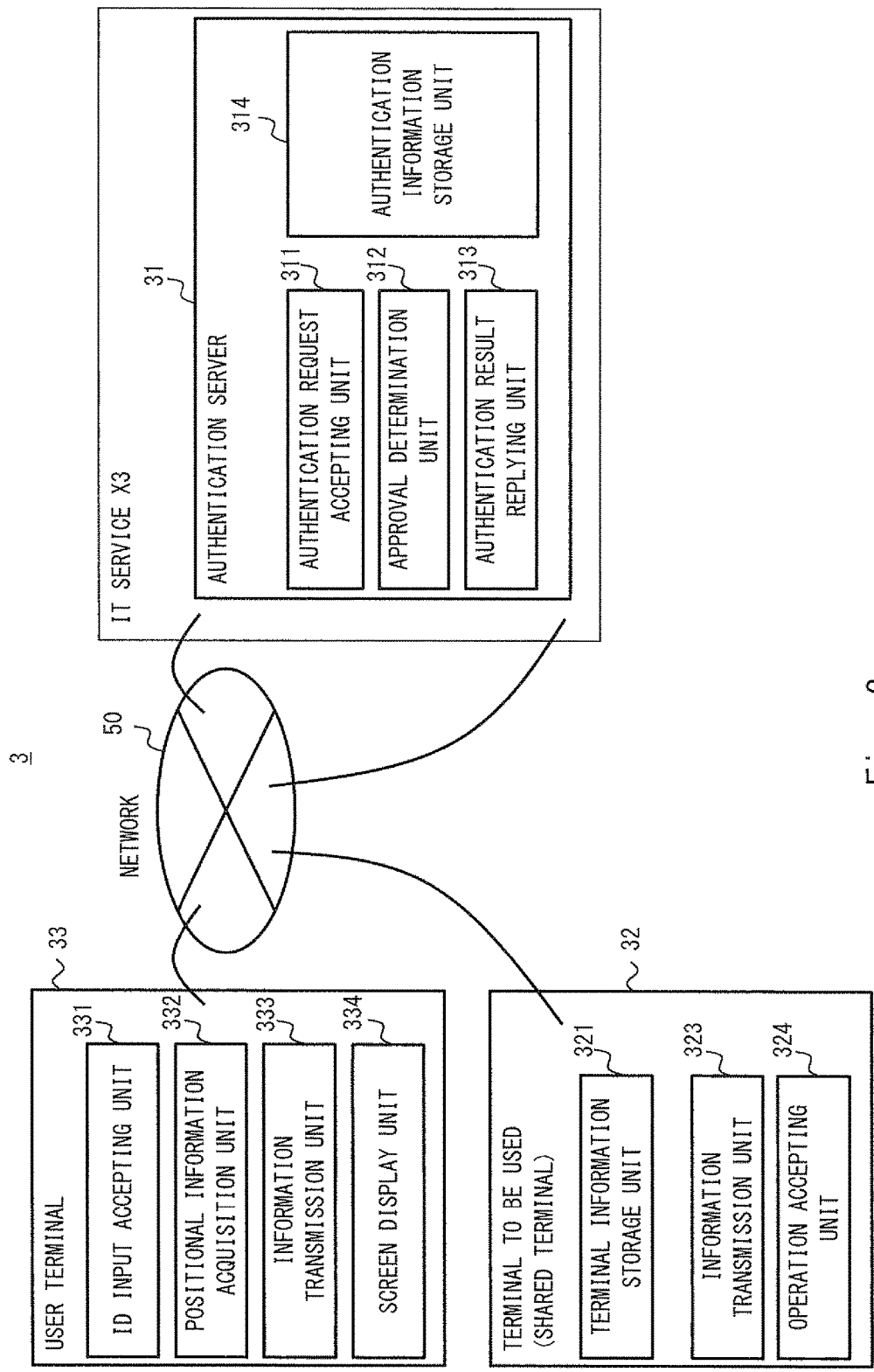
FIG. 8 is a block diagram showing a configuration example of a communication system according to a third embodiment.

FIG. 8 is a block diagram showing a configuration example of a communication system 3 according to a third embodiment. The communication system 3 shows one example of a more specific configuration of the communication system 1a shown in FIG. 3.

As shown in FIG. 8, the communication system 3 includes an authentication server 31, a terminal to be used 32, and a user terminal 33. The authentication server 31, the terminal to be used 32, and the user terminal 33 respectively correspond to the authentication server 21, the terminal to be used 22, and the user terminal 23 in the communication system 2. An IT service X3 is a public service and corresponds to the service X1 in the communication system 1a.

The authentication server 31 includes an authentication request accepting unit 311, an approval determination unit 312, an authentication result replying unit 313, and an authentication information storage unit 314. The authentication request accepting unit 311, the approval determination unit 312, the authentication result replying unit 313, and the authentication information storage unit 314 respectively correspond to the authentication request accepting unit 211, the approval determination unit 212, the authentication result replying unit 213, and the authentication information storage unit 214 of the authentication server 21.

The terminal to be used 32 is, for example, a dedicated shared terminal capable of using shared services and includes a terminal information storage unit 321, an information transmission unit 323, and an operation accepting unit 324.

The terminal information storage unit 321, the information transmission unit 323, and the operation accepting unit 324 respectively correspond to the terminal information storage unit 221, the information transmission unit 223, and the operation accepting unit 224 in the terminal to be used 22. The terminal to be used 32 may be hereinafter referred to as a shared terminal 32.

The user terminal 33 includes an ID input accepting unit 331, a positional information acquisition unit 332, an information transmission unit 333, and a screen display unit 334. The ID input accepting unit 331, the positional information acquisition unit 332, the information transmission unit 333, and the screen display unit 334 respectively correspond to the ID input accepting unit 231, the positional information acquisition unit 232, the information transmission unit 233, and the screen display unit 234 in the user terminal 23.

(Operations of Communication System 3)

Figure 9:
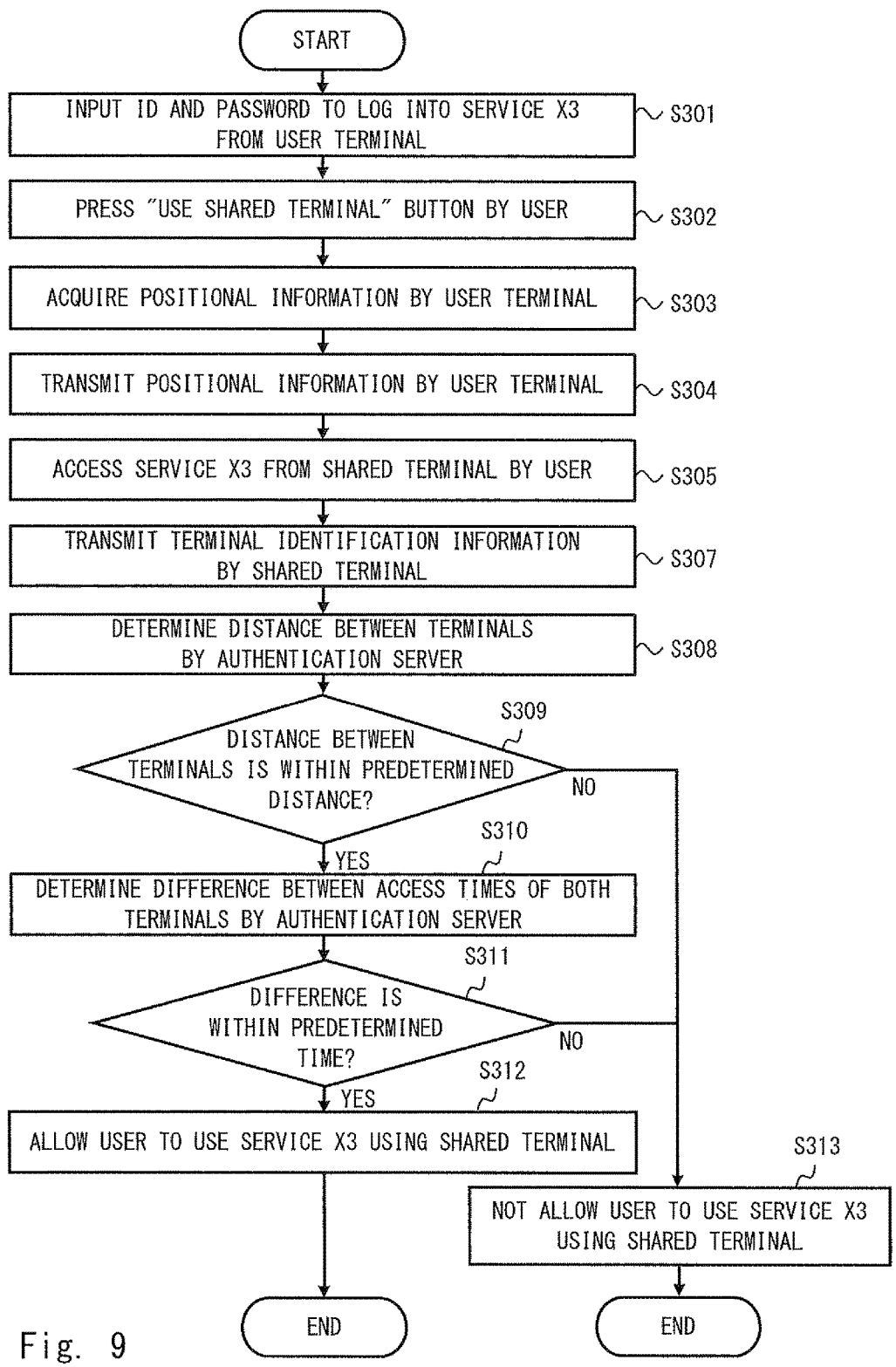
FIG. 9 is a flowchart showing operations of the communication system shown in FIG. 8.

FIG. 9 is a flowchart showing operations of the communication system 3. Steps S301-S305 and S307-S313 respectively correspond to Steps S201-S205 and S207-S213.

When the user wants to use the IT service X3 using the shared terminal 32, the user accesses the IT service X3 from the user terminal 33 to transmit the positional information and the user identification information (ID) and accesses the IT service X3 from the shared terminal 32 to transmit the terminal identification information. It is assumed that the user identification information (ID) of the user terminal 33 and the positional information of the shared terminal 32 are registered in the authentication server 31 in advance.

Specifically, the user inputs the ID and the password into the login screen of the IT service X3 displayed on the screen display unit 334 of the user terminal 33 (i.e., inputs the ID into the ID input accepting unit 331 of the user terminal 33), and logs into the IT service X3 from the user terminal 33 (Step S301).

After the user logs into the IT service X3, the user presses (clicks) the "use shared terminal" button displayed on the screen display unit 334 of the user terminal 33 (Step S302). In response to this operation, the positional information acquisition unit 332 of the user terminal 33 acquires the positional information of the user terminal 33 (Step S303).

After that, the information transmission unit 333 of the user terminal 33 transmits the positional information acquired by the positional information acquisition unit 332 and the user identification information input to the ID input accepting unit 331 to the authentication server 31 (Step S304).

The positional information of the user terminal 33 may be transmitted to the authentication server 31 regularly and automatically instead of being transmitted to the authentication server 31 when the button is pressed by the user.

While the time when the "use shared terminal" button has been pressed is defined to be an access time from the user terminal 33 to the IT service X3 (authentication server 31) in this example, this is merely an example and a desired trigger may be defined to be the access time.

Further, the user presses a predetermined button displayed on the screen of the shared terminal 32, a predetermined button physically provided in the shared terminal 32 or the like. That is, the user accesses the IT service X3 from the shared terminal 32 (Step S305). This operation is accepted by the operation accepting unit 324 of the shared terminal 32. In response to this operation, the information transmission unit 323 of the shared terminal 32 transmits the terminal identification information stored in the terminal information storage unit 321 to the authentication server 31 (Step S307).

While the time when the predetermined button of the shared terminal 32 has been pressed is defined to be an access time from the shared terminal 32 to the IT service X3 (authentication server 31) in this example, this is merely an example and a desired trigger may be defined to be the access time.

The information transmitted from the shared terminal 32 and the information transmitted from the user terminal 33 are received by the authentication request accepting unit 311 of the authentication server 31.

The approval determination unit 312 of the authentication server 31 first calculates, based on the positional information of the shared terminal 32 and that of the user terminal 33, the distance between the shared terminal 32 and the user terminal 33 and determines whether this distance is within a predetermined distance (Step S308). While the predetermined distance can be arbitrarily defined, it is typically in a range between 5 and 10 m when, for example, it is assumed that a smartphone is used as the user terminal 13.

When, for example, the distance between the shared terminal 32 and the user terminal 33 is outside the predetermined distance (NO in Step S309), the approval determination unit 312 does not allow the user of the user identification information transmitted from the user terminal 33 to use the IT service X3 using the shared terminal 32 (Step S313). This information is sent back to, for example, the user terminal 33 by the authentication result replying unit 313.

On the other hand, when the distance between the shared terminal 32 and the user terminal 33 is within the predetermined distance (YES in Step S309), the approval determination unit 312 of the authentication server 31 next determines whether the difference between the access time from the shared terminal 32 and the access time from the user terminal 33 is within the predetermined time (Step S310). While the predetermined time can be arbitrarily defined, the smaller the value is, the higher the security performance of the association becomes.

When, for example, the difference between both of the access times is outside the predetermined time (NO in Step S311), the approval determination unit 312 does not allow the user of the user identification information transmitted from the user terminal 33 to use the IT service X3 using the shared terminal 32 (Step S313). This information is sent back to, for example, the user terminal 33 by the authentication result replying unit 313.

On the other hand, when the difference between both of the access times is within the predetermined time (YES in Step S311), the approval determination unit 312 allows the user of the user identification information transmitted from the user terminal 33 to use the IT service X3 using the shared terminal 32 (Step S311). That is, the authentication server 31 associates (links) the user, the IT service X3, and the shared terminal 32 with one another. This information is stored in the authentication information storage unit 314 of the authentication server 31. At the same time, this information is sent back to, for example, the user terminal 33 by the authentication result replying unit 313.

As described above, the authentication server 31 according to this embodiment allows the user to use the IT service X3 using the shared terminal 32 only when the distance between the shared terminal 32 and the user terminal 33 is short and the difference between the access time from the shared terminal 32 and the access time from the user terminal 33 is small. Accordingly, the authentication server 31 is able to associate (link) the user, the IT service X3, and the terminal to be used 32 in a state in which a high security performance is maintained. As a result, the communication system 3 is able to prevent a situation in which, for example, a third party who has no right uses the terminal to be used.

In this embodiment, the association among the user, the IT service X3, and the shared terminal 32 by the authentication server 31 is temporary, and this association is canceled when a user has stopped using the shared terminal, or to be more specific, when information indicating that one user will stop using the shared terminal has been transmitted from the shared terminal 32 or when the distance between the user terminal 33 of one user and the shared terminal 32 becomes outside the predetermined distance. After this association is cancelled, another user is able to establish association. With such a configuration, it is possible to prevent the authentication information from remaining in the shared terminal 32. The authentication process by the authentication server 31 may be regularly performed in order to improve the security performance.

While the present invention has been described as a hardware configuration in the aforementioned embodiments, the present invention is not limited thereto. The present invention can achieve an arbitrary process by causing a central processing unit (CPU) to execute a computer program. Further, the aforementioned program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

While the present invention has been described above with reference to the embodiments, the present invention is not limited to the above embodiments. Various changes that may be understood by those skilled in the art may be made on the configurations and the details of the present invention within the scope of the present invention.

This application is based upon and claims the benefit of priority from Japanese Patent Application No. 2015-012453, filed on Jan. 26, 2015, the disclosure of which is incorporated herein in its entirety by reference.

REFERENCE SIGNS LIST 1-3,1a COMMUNICATION SYSTEM
11, 11a, 21, 31 AUTHENTICATION SERVER
12, 22, 32 TERMINAL TO BE USED
13, 23, 33 USER TERMINAL
50 NETWORK
100 COMPUTER
101 CPU
102 RAM
103 ROM
104 IF
105 HDD
106 AUTHENTICATION PROCESS PROGRAM
111 DISTANCE DETERMINATION UNIT
112 TIME-DIFFERENCE DETERMINATION UNIT
113 AVAILABILITY DETERMINATION UNIT
211 AUTHENTICATION REQUEST ACCEPTING UNIT
212 APPROVAL DETERMINATION UNIT
213 AUTHENTICATION RESULT REPLYING UNIT
214 AUTHENTICATION INFORMATION STORAGE UNIT
221 TERMINAL INFORMATION STORAGE UNIT
222 POSITIONAL INFORMATION ACQUISITION UNIT
223 INFORMATION TRANSMISSION UNIT
224 OPERATION ACCEPTING UNIT
231 ID INPUT ACCEPTING UNIT
232 POSITIONAL INFORMATION ACQUISITION UNIT
233 INFORMATION TRANSMISSION UNIT
234 SCREEN DISPLAY UNIT
311 AUTHENTICATION REQUEST ACCEPTING UNIT
312 APPROVAL DETERMINATION UNIT
313 AUTHENTICATION RESULT REPLYING UNIT
314 AUTHENTICATION INFORMATION STORAGE UNIT
321 TERMINAL INFORMATION STORAGE UNIT

322 POSITIONAL INFORMATION ACQUISITION UNIT
323 INFORMATION TRANSMISSION UNIT
324 OPERATION ACCEPTING UNIT
331 ID INPUT ACCEPTING UNIT
333 INFORMATION TRANSMISSION UNIT
334 SCREEN DISPLAY UNIT

The invention claimed is:

1. An authentication method in an authentication server comprising:
- a first determination step for determining, based on positional information of a terminal to be used and positional information of a mobile terminal which is different from the terminal to be used, whether the distance between the terminal to be used and the mobile terminal is within a predetermined distance;
- a determination step for determining, based on the result of the determination in the first determination step, whether to allow a user of user identification information transmitted from the mobile terminal to use a predetermined service using the terminal to be used; and
- a second determination step for determining whether the difference between a time when the positional information and terminal identification information are transmitted from the terminal to be used and a time when the positional information and the user identification information are transmitted from the mobile terminal is within a predetermined time,
- wherein, in the determination step, it is determined, based on the results of determination in the first and second determination steps, whether to allow the user of the user identification information transmitted from the mobile terminal to use the predetermined service using the terminal to be used.

2. The authentication method in the authentication server according to claim 1, wherein, when the distance between the terminal to be used and the mobile terminal is within the predetermined distance and the difference between the access time of the terminal to be used and the access time of the mobile terminal is within the predetermined time, the user is allowed to use the predetermined service using the terminal to be used.

3. An authentication server comprising:
- at least one memory storing instructions, and
- at least one processor configured to execute the instructions to;
- determine, based on positional information of a terminal to be used and positional information of a mobile terminal which is different from the terminal to be used, whether the distance between the terminal to be used and the mobile terminal is within a predetermined distance; and
- determine, based on the result of the determination regarding the distance, whether to allow a user of user identification information transmitted from the mobile terminal to use a predetermined service using the terminal to be used; and
- determine whether the difference between a time when the positional information and terminal identification information are transmitted from the terminal to be used and a time when the positional information and the user identification information are transmitted from the mobile terminal is within a predetermined time,
- wherein the at least one processor is configured to execute the instruction to determine, based on the result of the determination regarding the distance and that regarding the time difference, whether to allow the user of the user identification information transmitted from the mobile terminal to use the predetermined service using the terminal to be used.

4. The authentication server according to claim 1, wherein the at least one processor is configured to execute the instruction to allow, when the distance between the terminal to be used and the mobile terminal is within the predetermined distance and the difference between the access time of the terminal to be used and the access time of the mobile terminal is within the predetermined time, the user to use the predetermined service using the terminal to be used.

5. A communication system comprising:
- the authentication server according to claim 3;
- the mobile terminal; and
- the terminal to be used.

6. A non-transitory computer readable medium storing an authentication process program of an authentication server for causing a computer to execute the following processes:
- a first determination process for determining, based on positional information of a terminal to be used and positional information of a mobile terminal which is different from the terminal to be used, whether the distance between the terminal to be used and the mobile terminal is within a predetermined distance;
- a determination process for determining, based on the result of the determination in the first determination process, whether to allow a user of user identification information transmitted from the mobile terminal to use a predetermined service using the terminal to be used; and
- a second determination process for determining whether the difference between a time when the positional information and terminal identification information are transmitted from the terminal to be used and a time when the positional information and the user identification information are transmitted from the mobile terminal is within a predetermined time,
- wherein, in the determination process, it is determined, based on the results of determination in the first and second determination processes, whether to allow the user of the user identification information transmitted from the mobile terminal to use the predetermined service using the terminal to be used.

7. The non-transitory computer readable medium storing the authentication process program of the authentication server according to claim 6, wherein, when the distance between the terminal to be used and the mobile terminal is within the predetermined distance and the difference between the access time of the terminal to be used and the access time of the mobile terminal is within the predetermined time, the user is allowed to use the predetermined service using the terminal to be used.

* * * * *